Figure 1:
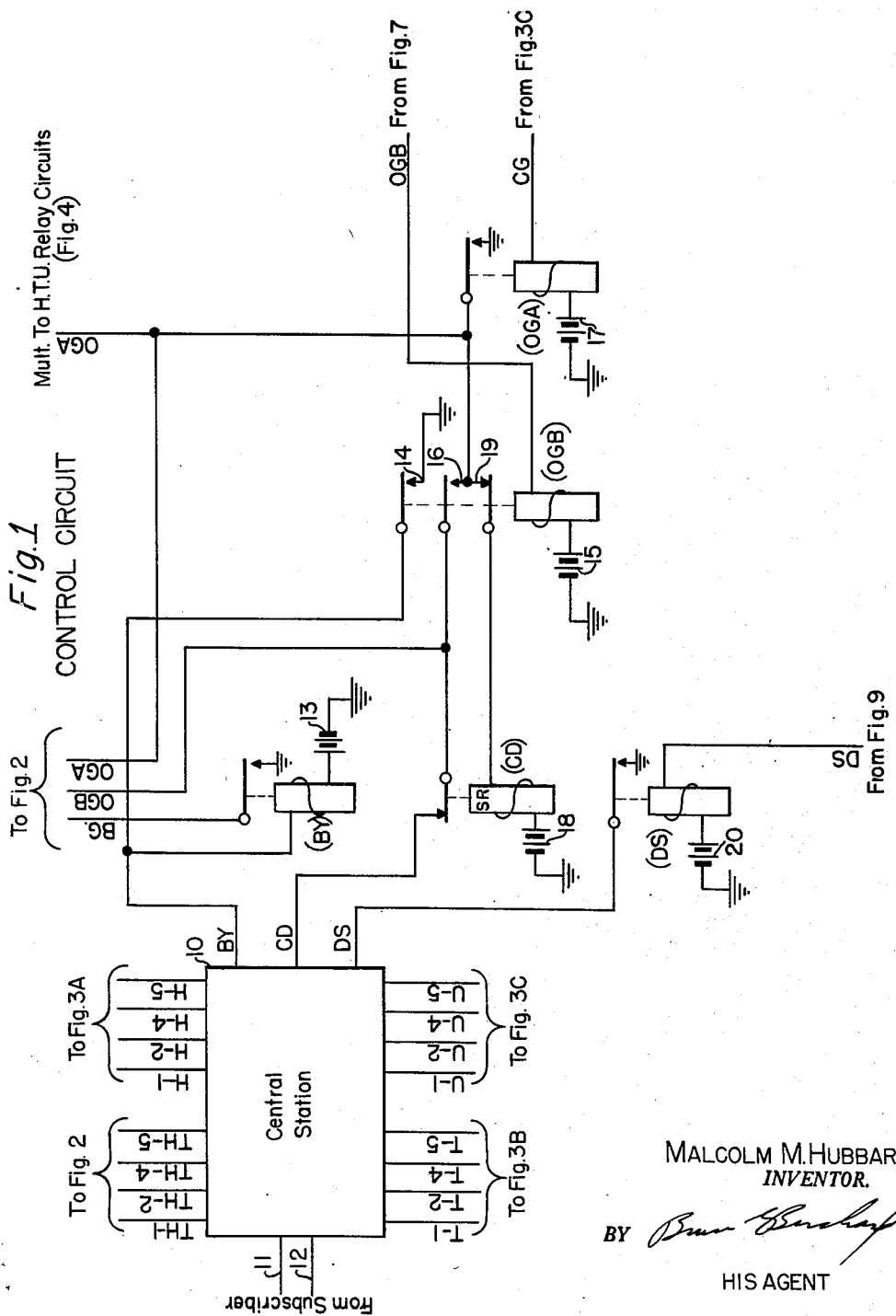

Oct. 28, 1952 M. M. HUBBARD 2,615,972
CREDIT VERIFICATION FOR SUBSCRIPTION TYPE TELEVISION SYSTEMS
Filed April 22, 1949 9 Sheets-Sheet 1

MALCOLM M. HUBBARD
*INVENTOR.*
BY
HIS AGENT

Oct. 28, 1952     M. M. HUBBARD     2,615,972
CREDIT VERIFICATION FOR SUBSCRIPTION TYPE TELEVISION SYSTEMS
Filed April 22, 1949     9 Sheets-Sheet 2

TH.CODE RELAY CIRCUIT

MALCOLM M. HUBBARD
*INVENTOR.*
BY
HIS AGENT

Oct. 28, 1952     M. M. HUBBARD     2,615,972
CREDIT VERIFICATION FOR SUBSCRIPTION TYPE TELEVISION SYSTEMS
Filed April 22, 1949     9 Sheets-Sheet 3
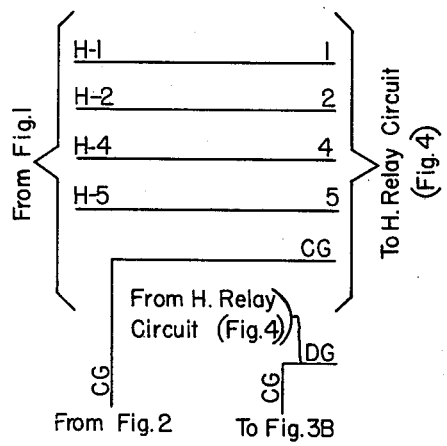
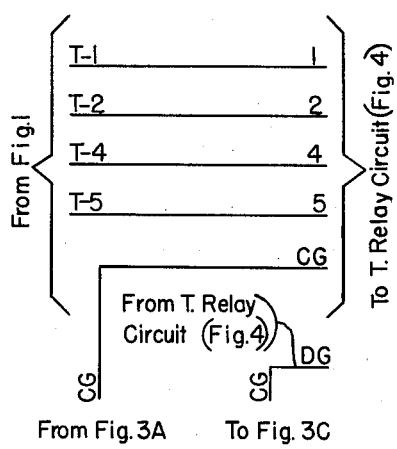
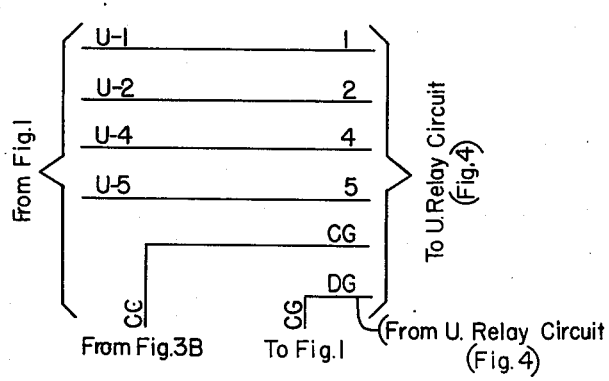
MALCOLM M. HUBBARD
*INVENTOR.*
BY *Bruce Burchard*
HIS AGENT

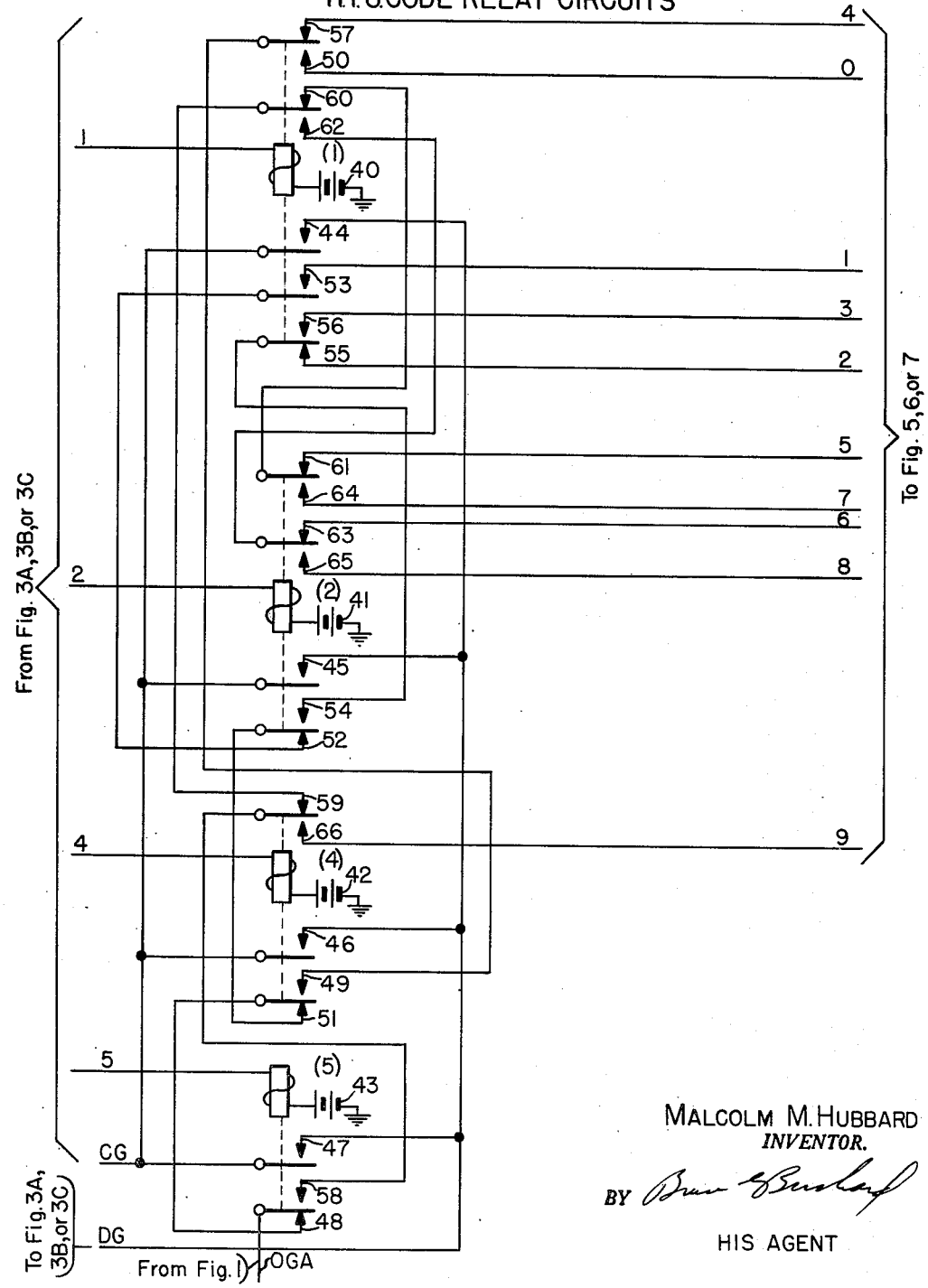

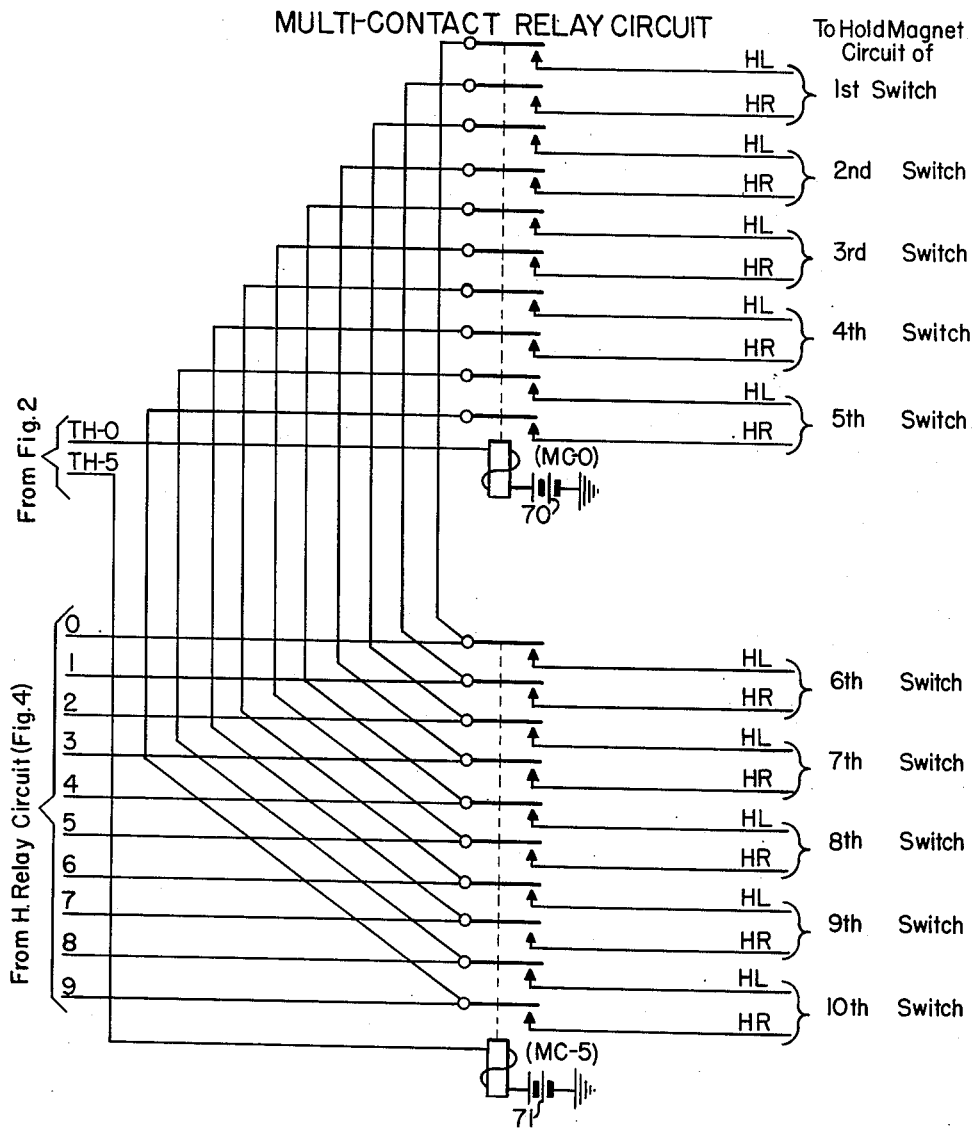

Oct. 28, 1952 M. M. HUBBARD 2,615,972
CREDIT VERIFICATION FOR SUBSCRIPTION TYPE TELEVISION SYSTEMS
Filed April 22, 1949 9 Sheets-Sheet 6

SELECT MAGNET CIRCUIT (ONE SWITCH)

MALCOLM M. HUBBARD
*INVENTOR.*

BY
HIS AGENT

Oct. 28, 1952     M. M. HUBBARD     2,615,972
CREDIT VERIFICATION FOR SUBSCRIPTION TYPE TELEVISION SYSTEMS
Filed April 22, 1949     9 Sheets-Sheet 7
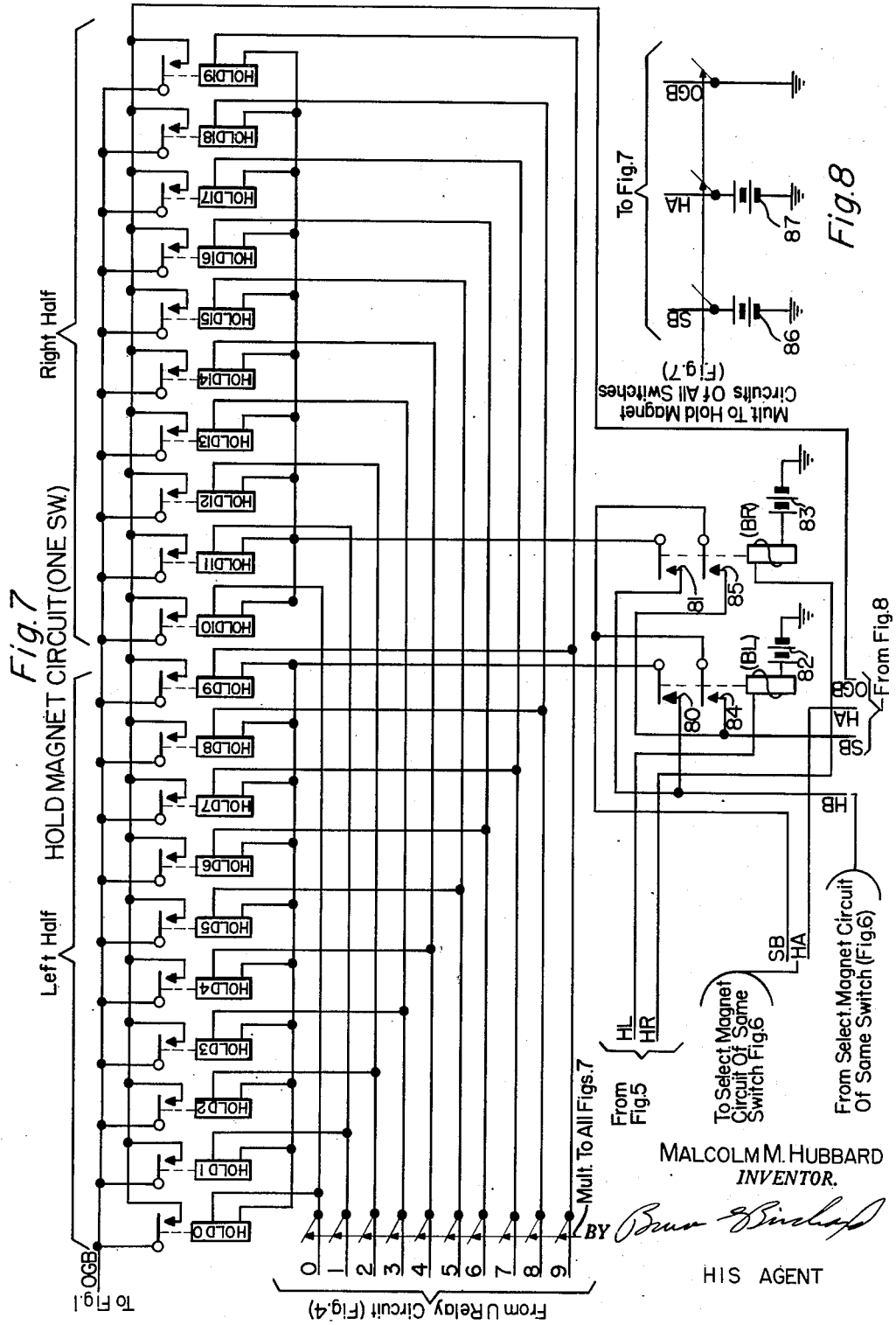
MALCOLM M. HUBBARD
INVENTOR.
BY
HIS AGENT

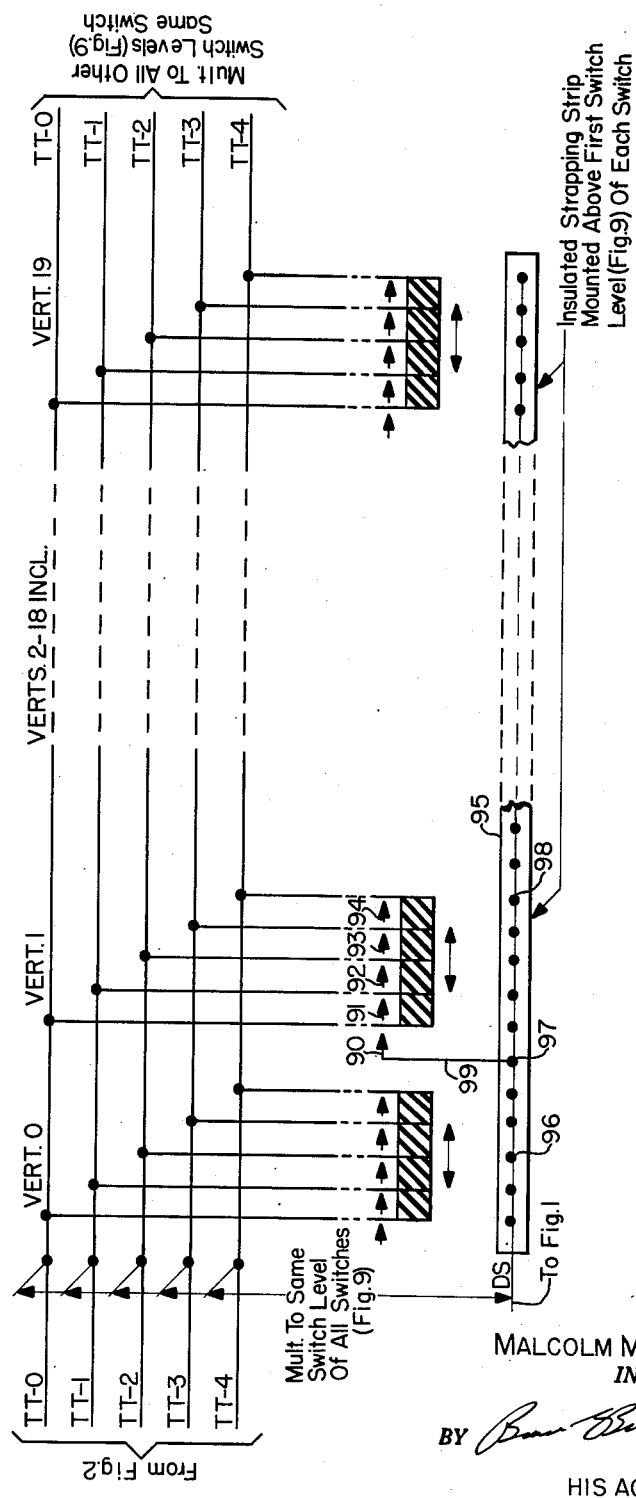

Oct. 28, 1952 M. M. HUBBARD 2,615,972
CREDIT VERIFICATION FOR SUBSCRIPTION TYPE TELEVISION SYSTEMS
Filed April 22, 1949 9 Sheets-Sheet 9
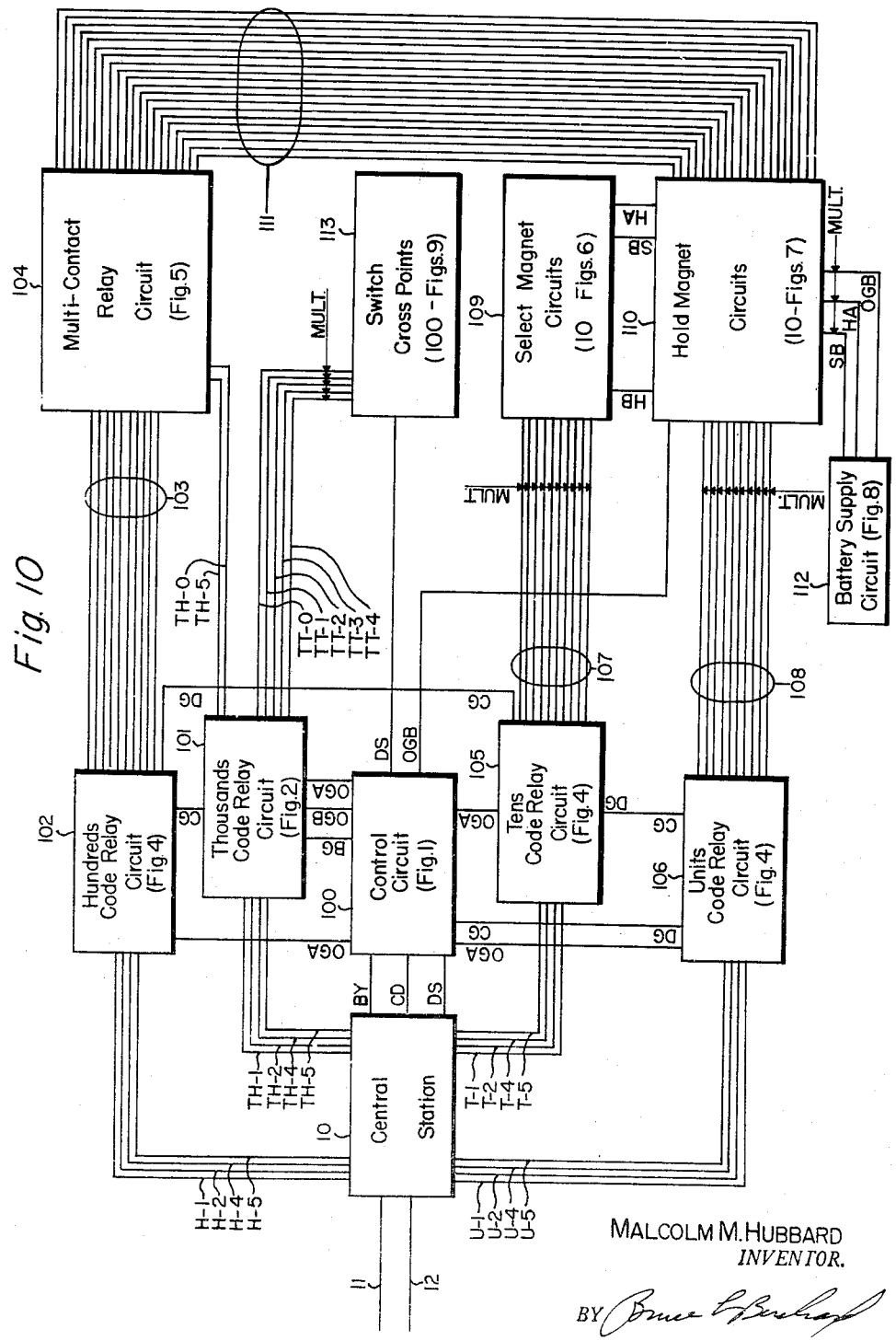
MALCOLM M. HUBBARD
INVENTOR.
BY
HIS AGENT Patented Oct. 28, 1952

2,615,972

UNITED STATES PATENT OFFICE 2,615,972

CREDIT VERIFICATION FOR SUBSCRIPTION TYPE TELEVISION SYSTEMS

Malcolm M. Hubbard, Marblehead, Mass., assignor to Zenith Radio Corporation, a corporation of Illinois Application April 22, 1949, Serial No. 89,069

9 Claims. (Cl. 177—353)

This invention relates to automatic traffic equipment, and more particularly, to such equipment as may find advantageous use in connection with subscription type radio or television systems.

In the copending application of Alexander Ellett et al., Serial Number 742,374, filed April 18, 1947, for "Radio-Wire Signalling System," now U. S. Patent 2,510,046, issued May 30, 1950, assigned to the same assignee as the present application, there is disclosed and claimed a subscription type television system in which the radiated program signals are coded in accordance with a predetermined code schedule and in which a supplementary key signal representing such predetermined code schedule is transmitted over a second channel, as by telephone link, to authorized subscribers. Proper reproduction of the broadcast image is obtained at each receiver only upon proper correlation of the received radiated program signal and the wire-conducted key signal.

A particular arrangement embodying such a subscription type television system is disclosed and claimed in the copending application of Erwin M. Roschke, Serial No. 773,848, filed September 13, 1947, for "Subscription Image Transmission System and Apparatus," assigned to the same assignee as the present application, now U. S. Patent 2,547,598, dated April 3, 1951, in which the coding is accomplished by altering, either regularly or at random intervals, the time relation between the synchronizing-signal components and the video-signal components of the radiated program signal. The key signal then represents the operating intervals in which there is a change in the time relation between these components.

A further television system of the subscription type is disclosed and claimed in the copending application of Roswell M. Herrick et al., Serial No. 75,988, filed February 12, 1949, for "Subscriber Signalling System" assigned to the same assignee as the present application. In this embodiment, coding is accomplished in accordance with a repetitive code schedule of short duration relative to the program interval. With such an arrangement, a subscriber desiring to receive a coded program makes a call to a central station or alternatively to a private branch exchange at the transmitter, and receives, over the telephone lines, a key signal pattern which represents the code schedule of the radiated program signal and which is recorded in suitable apparatus associated with the receiver. The recorded key signal pattern is utilized recurrently to decode the broadcast information throughout the program interval.

There is disclosed and claimed in the copending application of Alexander Ellett et al., Serial No. 83,622, filed March 26, 1949, for "Coded-Signal Receiver with Revertive Signalling," assigned to the same assignee as the present application, now U. S. Patent 2,545,770, issued March 20, 1951, a modified system of the type disclosed in the aforementioned Herrick application in which positive identification of the subscriber desiring to receive the key signal pattern is accomplished. Each subscriber's receiver is equipped with a signal storage device carrying a coded identification signal representing that subscriber. On making the telephone call to the central station or private branch exchange, the subscriber's identification code is transmitted to the central station in order that he may be identified and an appropriate program charge may be made.

With an arrangement of this latter type, it is particularly desirable that the central station or private branch exchange be equipped with apparatus for automatically verifying the credit standing of the subscriber requesting the key signal pattern. Furthermore, since a large number of calls from subscribers desiring to receive any given program may be expected within a relatively short interval prior to the time that the program is scheduled to begin, it is desirable that such verification be accomplished automatically within a minimum time interval.

It is an important object of this invention to provide improved apparatus for obtaining information regarding an identification code received at a central station by wire line.

It is a further object of the invention to provide equipment for verifying automatically and within a minimum time interval the credit standing of a subscriber represented by an identification code.

Still another object of the invention is to provide economical automatic traffic equipment responsive to an identification code for indicating denial of service in the event that the credit standing of the subscriber represented by such code is unsatisfactory.

The present invention provides apparatus for automatically obtaining at a central station information regarding a multi-component identification code each component of which is represented by a series of electrical signals. The apparatus comprises a plurality of cross bar switches individually having a column of select magnets and a row of hold magnets and individually having contact terminals at the cross point defined by each select magnet and each hold magnet. Corresponding select magnets in each column are multipled together in groups, as are corresponding hold magnets in each row. Each contact terminal is assigned to represent an individual identification code. A signalling circuit extends from the cross bar switches to the central station, and means are provided which extend from one of the contact terminals to the signalling circuit to establish a signalling condition in the signalling circuit which represents information to be disseminated with respect to the identification code assigned to that terminal. Apparatus is provided for converting each series of signals to a single index signal representing one component of the identification code. Means are provided for supplying a first index signal to a selected group of multipled hold magnets and for supplying a second index signal to a selected group of multipled select magnets thereby to condition a plurality of cross points for operation. Means are also provided for operating the contacts associated with a single cross point in response to the application of a third index signal.

The features of the present invention which are believed to be novel are set forth with particularity in the appended claims. The invention, together with further objects and advantages thereof, may more readily be understood, however, by reference to the following description taken in connection with the accompanying drawings, in which like reference numerals indicate like elements, and in which Figures 1-9 collectively represent, in schematic form, a preferred embodiment of automatic traffic equipment constructed in accordance with the present invention, and Figure 10 is a schematic representation of the composite system represented in detail in Figures 1-9.

Reference is first made to Figure 10, which represents in block diagram form a complete number checker constructed in accordance with the present invention, for a simplified representation of the organization and operation of the automatic traffic equipment disclosed in detail in Figures 1-9 collectively. In Figure 10, an incoming subscriber's identification code is transmitted in any manner well known in the art over telephone lines 11 and 12 to a central station 10. For example, the illustrated system is designed with a traffic capability of 10,000 subscribers, and a four-period decimal code may be used. At the central station, the identification code received over lines 11 and 12 is converted by suitable equipment to a series of signals on outgoing leads TH-1 to TH-5, H-1 to H-5, T-1 to T-5, and U-1 to U-5, each series of signals comprising a combination of grounds and "opens" on a set of four leads and representing one of the digits or indices of the code number.

Upon the receipt of the complete identification code over lines 11 and 12 at the central station 10, an outgoing "busy" lead BY to a control circuit 100 is grounded either manually or automatically to initiate the number checking operation. Control circuit 100 transmits a ground over "B ground" lead BG to actuate a thousands code relay circuit 101 which operates to convert the signal appearing on leads TH-1 through TH-5 to a pair of test signals by extending an "operating ground A" lead OGA to output lead TH-O or TH-5 and by extending an "operating ground B" lead OGB to one of leads TT-0 through TT-4.

Operation of the thousands code relays of circuit 101 places a ground on "C ground" lead CG to a hundreds code relay circuit 102, which converts the signal appearing on leads H-1 through H-4, representing the hundreds digit, to a single index signal by extending lead OGA from control circuit 100 to one of ten outgoing leads 103 extending to a multi-contact relay circuit 104. Similarly, the signals on leads T-1 through T-5 and U-1 through U-5 are sequentially converted to respective individual index signals by means of a tens code relay circuit 105 and a units code relay circuit 106 which operate to extend lead OGA from control circuit 100 to a single one of each of the respective groups of output leads 107 and 108.

Completion of this sequence of operations results in a transmission to the control circuit 100 of a ground over lead DG—CG from units code relay circuit 106. Upon receipt of this ground, outgoing leads OGA from control circuit 100 to tens code relay circuit 105 and units code relay circuit 106 are grounded, and these grounds are extended through the operated circuits and the preselected one of each group of leads 107 and 108 to the select magnet circuits 109 and the hold magnet circuits 110 respectively of a bank of ten multipled 200-point cross bar switches. The grounded one of leads 107 conditions a single select magnet of each cross bar switch for operation, while the grounded one of leads 108 conditions a pair of hold magnets of each cross bar switch for operation.

At the same time, outgoing lead OGA to the thousands code relay circuit 101 is grounded, and this ground is extended through the preselected one of leads TH-0, TH-5 to the multi-contact relay circuit 104. Moreover, the ground on outgoing lead OGA from control circuit 100 is extended through hundreds code relay circuit 102 and the preselected one of leads 103 to multi-contact relay circuit 104 which then operates to extend the ground from hundreds code relay circuit 102 through one of a group of twenty leads 111 to the hold magnet circuits 110 of one-half a single one of the cross bar switches, and this ground functions to supply operating voltage to the preconditioned select and hold magnets of that particular cross bar switch from a battery supply circuit 112.

In summary, then, the tens index signal and the units index signal condition a single select magnet and a pair of hold magnets of each of ten multipled cross bar switches for operation. The hundreds index signal and one of the thousands test signals cooperate to select a single half of a single cross bar switch for energization from battery supply circuit 112. Consequently, the contact terminals of a single cross point are operated.

Operation of the contact terminals at the selected cross point causes a ground to be transmitted back to control circuit 100 over lead OGB from battery supply circuit 112 through hold magnet circuits 110. This ground is extended through thousands code relay circuit 101 to the preselected one of thousands test leads TT-0 through TT-4, which are cross-wired to corresponding contact terminals of all cross points 113 of all cross bar switches. In the event that the credit standing of the subscriber corresponding to the received identification code is not satisfactory, the particular selected contact terminal at the operated cross point is preconnected to a signalling circuit, comprising a "denial of service" lead DS, extending to central station 10 through control circuit 100. In the event that the credit rating is satisfactory, no such preconnection is made. Consequently, the appearance of a ground on lead DS at central station 10 indicates that the credit standing of the subscriber is unsatisfactory, while the presence of an "open" or the absence of a ground on that lead indicates a satisfactory credit standing.

Figure 1 is a schematic circuit diagram of that portion of a number checker constructed in accordance with the present invention which, for convenience, is designated the "control circuit." A central station or private branch exchange 10, which may include, in addition to the customary telephone equipment, a recorder for making a permanent record of the incoming identification code signals, is connected to an individual subscriber's telephone line by means of a pair of leads 11 and 12. A set of four leads TH-1, TH-2, TH-4, and TH-5, is connected from the central station 10 to the thousands code relay circuit shown schematically in Figure 2. Similarly, sets of four leads H-1, H-2, H-4, H-5; T-1, T-2, T-4, T-5; and U-1, U-2, U-4, U-5 are connected from central station 10 respectively to the hundreds code relay coupling circuit of Figure 3A, the tens code relay coupling circuit of Figure 3B and the units code relay coupling circuit of Figure 3C.

The operating coil of a make "busy" relay (BY) is coupled between ground and the central station 10 by way of a "busy" lead BY through a relay operating battery 13. The normally open contact of relay (BY) is connected between ground and a "B ground" lead BG, which lead extends to the thousands code relay circuit of Figure 2.

"Busy" lead BY from central station 10 also extends to ground through a normally open contact 14 of an "operating ground B" relay (OGB), the operating coil of which relay is coupled between ground and an "operating ground B" lead OGB from the hold magnet circuit of Figure 7 through a relay operating battery 15. Another normally open contact 16 of relay (OGB) is included in a circuit between ground and lead OGB extending to the thousands code relay circuit of Figure 2, which circuit between ground and outgoing lead OGB also includes the normally open contact of an "operating ground A" relay (OGA). The operating coil of relay (OGA) is coupled between ground and a "C ground" lead CG from the units code relay coupling circuit of Figure 3C through a relay operating battery 17. The normally open contact of relay (OGA) is included in a circuit between ground and "operating ground A" leads OGA extending to the thousands (TH) code relay circuit of Figure 2 and multipled to the hundreds (H) code relay circuit, the tens (T) code relay circuit, and the units (U) code relay circuit each of which is constructed as shown in Figure 4.

The operating coil of a "checker disconnect" relay (CD), of the slow release type, is included in a circuit between ground and outgoing lead OGA through a relay operating battery 18 and a normally closed contact 19 of relay (OGB). The normally closed contact of relay (CD) is connected between central station 10 and outgoing lead OGB through a "checker disconnect" lead CD.

The operating coil of a "denial of service" relay (DS) is connected between ground and an incoming "denial of service" lead DS from an insulated strapping strip, shown in Figure 9, associated with each cross bar switch, through a relay operating battery 20. The normally open contact of relay (DS) is included in a circuit between ground and a "denial of service" lead DS extending to central station 10.

Figure 2:
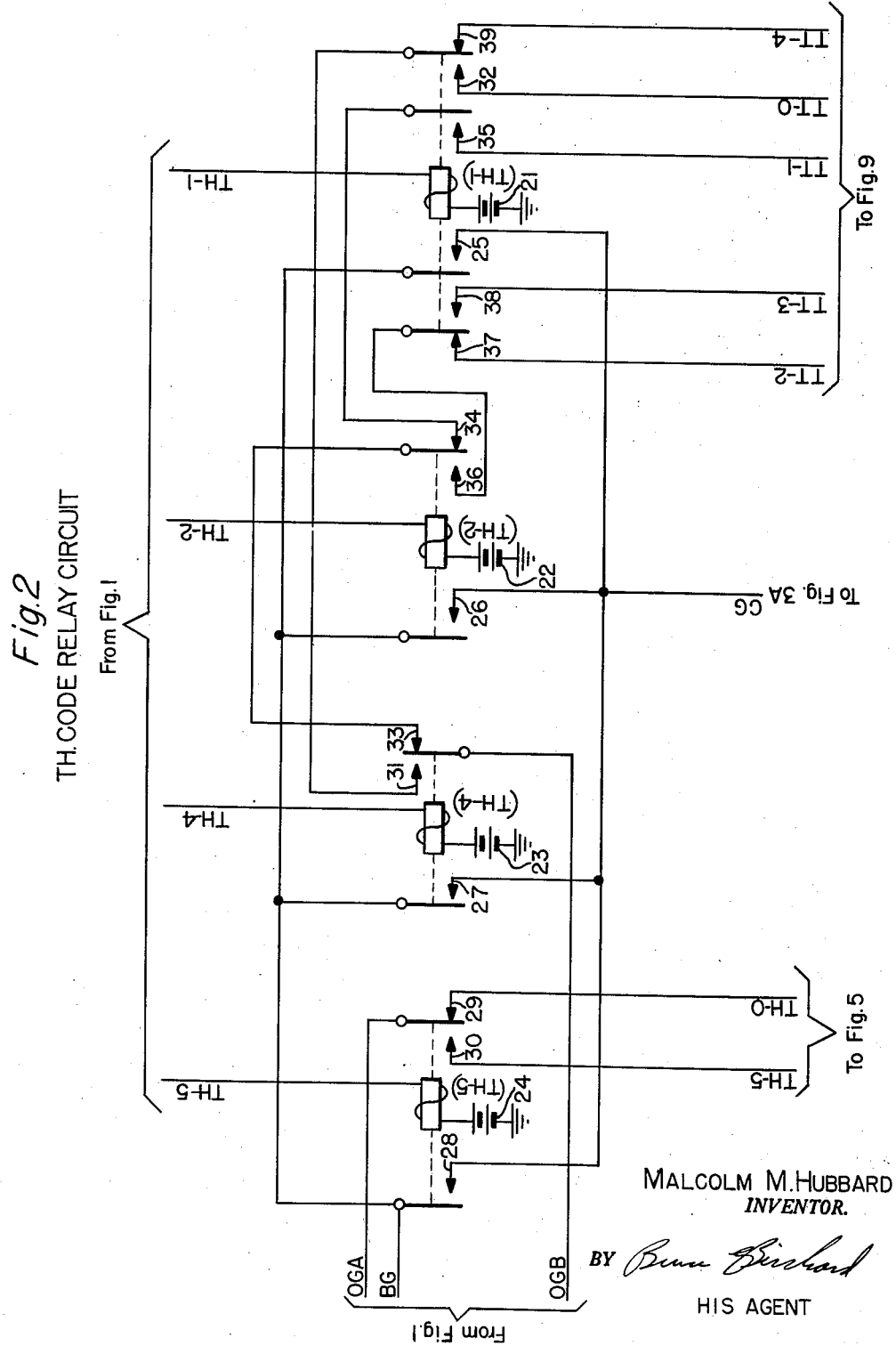

Figure 2 is a schematic circuit diagram of that portion of the number checker which, for convenience, is termed the "thousands code relay circuit." Leads TH-1, TH-2, TH-4, TH-5, from central station 10 of Figure 1, are connected respectively through the operating coils of thousands digit relays (TH-1), (TH-2), TH-4), and (TH-5) and relay operating batteries 21, 22, 23, and 24, to ground. "B ground" lead BG, from the control circuit of Figure 1, extends in parallel through normally open contacts 25, 26, 27, and 28 of relays (TH-1), (TH-2), (TH-4), and (TH-5) respectively to an outgoing "C ground" lead CG extending to the hundreds code relay coupling circuit of Figure 3A.

"Operating ground A" lead OGA, from the control circuit of Figure 1, extends through a normally closed contact 29 and a normally open contact 30, respectively, of relay (TH-5) to outgoing leads TH-0 and TH-5 extending to the multi-contact relay circuit of Figure 5.

"Operating ground B" lead OGB, from the control circuit of Figure 1, extends to an outgoing "thousands test 0" lead TT-0 through a normally open contact 31 of relay (TH-4) and a normally open contact 32 of relay (TH-1). Lead OGB extends to a "thousands test 1" lead TT-1 through a normally closed contact 33 of relay (TH-4), a normally closed contact 34 of relay (TH-2), and a normally open contact 35 of relay (TH-1). Lead OGB extends to a "thousands test 2" lead TT-2 through contact 33 of relay (TH-4), a normally open contact 36 of relay (TH-2), and a normally closed contact 37 of relay (TH-1). Lead OGB extends to a "thousands test 3" lead TT-3 through contact 33 of relay (TH-4), contact 36 of relay (TH-2), and a normally open contact 38 of relay (TH-1). Lead OGB also extends to a "thousands test 4" lead TT-4 through contact 31 of relay (TH-4) and a normally closed contact 39 of relay (TH-1). "Thousands test" leads TT-0, TT-1, TT-2, TT-3, and TT-4, extend outwardly to the circuit of Figure 9.

Figures 3A, 3B and 3C are schematic representations of coupling circuits extending between the hundreds leads, the tens leads, and the units leads from central station 10 of Figure 1 and the hundreds code relay circuit, the tens code relay circuit, and the units code relay circuit, respectively, each of which is constructed as shown schematically in Figure 4. These coupling circuits are included in order to make it possible to represent the hundreds code relay circuit, the tens code relay circuit, and the units code relay circuit in a single diagram, and are believed to be self-explanatory.

Figure 4 is a schematic circuit diagram of the hundreds code relay circuit, the tens code relay circuit, or the units code relay circuit; it is to be understood that each number checker comprises three such circuits, one to accommodate each of the respective hundreds, tens, and units digits of the identification code. Each of the incoming leads 1, 2, 4, and 5, is connected to ground through the operating coil of an associated relay (1), (2), (4), and (5) and through a relay operating battery 40, 41, 42, and 43, respectively. "C ground" lead CG is connected to "D ground" lead DG through parallel paths comprising normally open contacts 44 of relay (1), 45 of relay (2), 46 of relay (4), and 47 of relay (5). Leads 1, 2, 4, 5, CG, and DG are connected to the corresponding leads of the appropriate coupling circuit of Figures 3A, 3B, and 3C.

"Operating ground A" lead OGA from the control circuit of Figure 1 extends to an outgoing lead 0 through a normally closed contact 48 of relay (5), a normally open contact 49 of relay (4), and a normally open contact 50 of relay (1). Lead OGA extends to outgoing lead 1 through contact 48 of relay (5), a normally closed contact 51 of relay (4), a normally closed contact 52 of relay (2), and a normally open contact 53 of relay (1). Lead OGA extends to outgoing lead 2 through contact 48 of relay (5), contact 51 of relay (4), a normally open contact 54 of relay (2), and a normally closed contact 55 of relay (1). Lead OGA extends to outgoing lead 3 through contact 48 of relay (5), contact 51 of relay (4), contact 54 of relay (2), and a normally open contact 56 of relay (1). Lead OGA extends to an outgoing lead 4 through contact 48 of relay (5), contact 49 of relay (4), and a normally closed contact 57 of relay (1).

Lead OGA also extends to outgoing lead 5 through a normally open contact 58 of relay (5), a normally closed contact 59 of relay (4), a normally closed contact 60 of relay (1), and a normally closed contact 61 of relay (2). Lead OGA extends to outgoing lead 6 through contact 58 of relay (5), contact 59 of relay (4), a normally open contact 62 of relay (1), and a normally closed contact 63 of relay (2). Lead OGA extends to outgoing lead 7 through contact 58 of relay (5), contact 59 of relay (4), contact 60 of relay (1), and a normally open contact 64 of relay (2). Lead OGA extends to outgoing lead 8 through contact 58 of relay (5), contact 59 of relay (4), contact 62 of relay (1), and a normally open contact 65 of relay (2). Lead OGA also extends to outgoing lead 9 through contact 58 of relay (5) and a normally open contact 66 of relay (4). Outgoing leads 0-9 extend to the multi-contact relay circuit of Figure 5, the select magnet circuit of Figure 6, or the hold magnet circuit of Figure 7, depending on whether the circuit of Figure 4 is the hundreds code relay circuit, the tens code relay circuit or the units code relay circuit, respectively.

Figure 5 is a schematic representation of the multi-contact relay circuit. Incoming leads TH-0 and TH-5 from the thousands code relay circuit of Figure 2 are connected to ground through the operating coils of respective "multi-contact" relays (MC-0) and (MC-5) and through respective relay operating batteries 70 and 71. Each of the "multi-contact" relays (MC-0) and (MC-5) is equipped with a set of ten normally open contacts, and corresponding contacts of each of the relays are multipled. Leads 0-9 from the hundreds code relay circuit (Figure 4) are connected to correspondingly numbered ones of the multipled contacts associated with "multi-contact" relays (MC-0) and (MC-5). An outgoing lead is provided for each of the contacts of these relays, the outgoing leads HL and HR being grouped in pairs and extending to the hold magnet circuits of the respective cross bar switches, an exemplary one of such circuits being shown in Figure 7.

Figure 6:
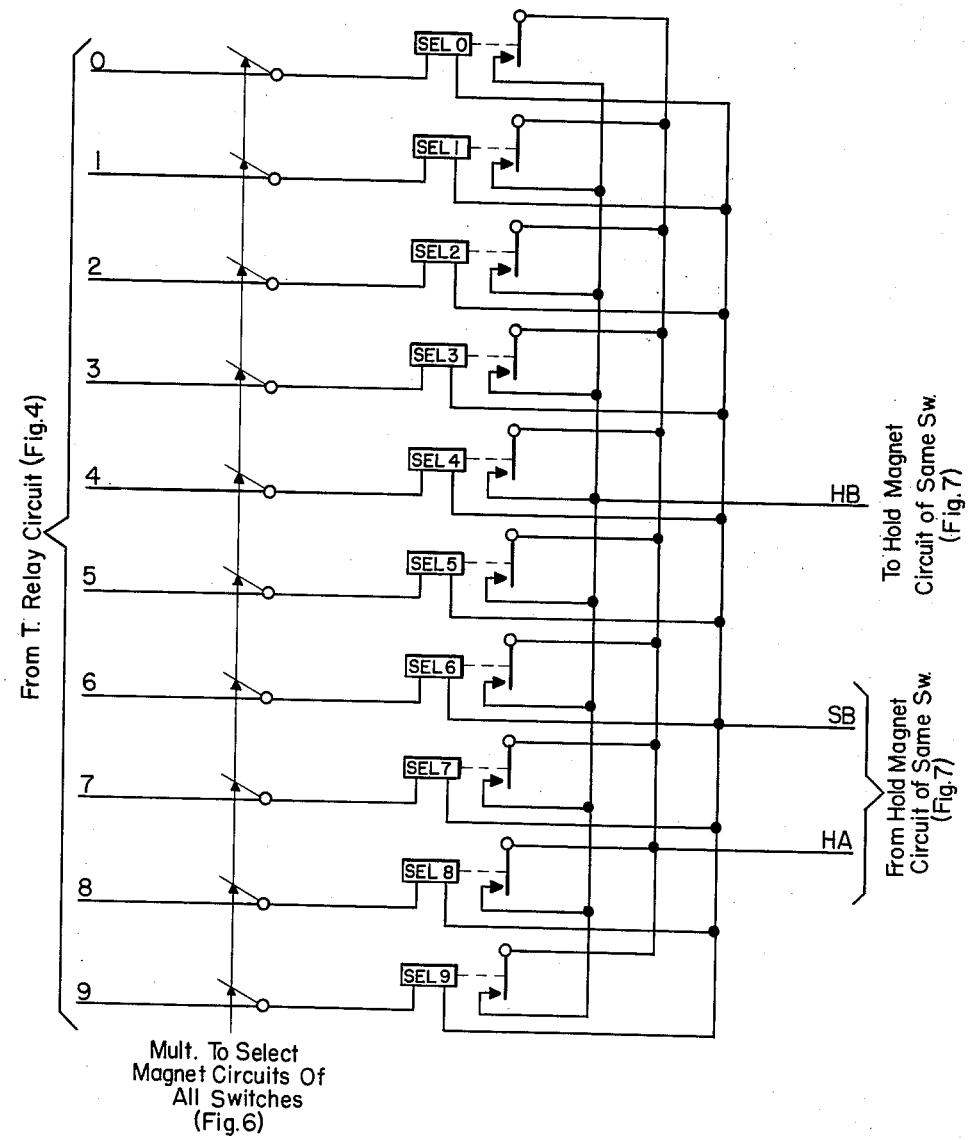

Figure 6 is a schematic representation of the select magnet circuit associated with each of the ten cross bar switches included in the number checker. It has been convenient to illustrate only one of the select magnet circuits, it being understood that there are nine other such circuits each identical to that shown in Figure 6. Incoming leads 0-9 from the tens code relay circuit (Figure 4) are connected in parallel to an incoming "select-magnet battery" lead SB through the respective operating coils of select magnets SEL-0 through SEL-9. The contacts of each select magnet are connected in parallel between incoming hold magnet battery "hold A" lead HA and outgoing "hold B" lead HB. Incoming leads 0-9 are multipled to the corresponding leads of all the other select magnet circuits within the number checker. Leads SB, HA, and HB extend to the hold magnet circuits, represented in Figure 7, of the same cross bar switch.

Figure 7 is a schematic representation of the hold magnet circuit of each cross bar switch. It has been convenient to illustrate only one hold magnet circuit, although it must be remembered that a similar circuit is associated with each of the ten cross bar switches included in the number checker. Each cross bar switch has been shown as comprising twenty hold magnets instead of the customary ten; the reasons for such construction will become apparent when the operation of the number checker is described in detail. Thus, in effect, each cross bar switch, having ten select magnets and twenty hold magnets, is equivalent to a pair of conventional 100-point cross bar switches.

Incoming leads 0-9 from the units code relay circuit (Figure 4) are connected through respective hold magnets Hold 0-Hold 9 and through a normally open contact 80 associated with a "battery left" relay (BL) to incoming leads HB from the select magnet circuit of the same switch. Similarly incoming leads 0-9 are connected through respective hold magnets Hold 10-Hold 19 and through a normally open contact 81 of a "battery right" relay (BR) to incoming lead HB. Leads 0-9 are multipled to corresponding leads in each of the hold magnet circuits of the other cross bar switches included in the number checker.

The contacts associated with each of the hold magnets Hold 0-Hold 19 are connected in parallel between an outgoing lead OGB to the control circuit of Figure 1 and an incoming lead OGB from the battery supply circuit of Figure 8.

Incoming leads HL and HR from the multi-contact relay circuit of Figure 5 are connected to ground through the operating coils of respective relays (BL) and (BR) and through respective relay operating batteries 82 and 83. Outgoing lead SB to the select magnet circuit (Figure 6) of the same cross bar switch extends through a normally open contact 84 of relay (BL) to incoming lead SB from the battery supply circuit of Figure 8; lead SB to the select magnet circuit also extends to lead SB from the battery supply circuit through a normally open contact 85 associated with relay (BR). Outgoing lead HA to the select magnet circuit (Figure 6) of the same cross bar switch extends directly to incoming lead HA from the battery supply circuit of Figure 8.

Figure 8 is a schematic representation of the battery supply circuit for the hold magnets and the select magnets of the cross bar switches. Operating voltage for energizing a selected one of the select magnets is supplied from a grounded battery 86 to an outgoing "select-magnet battery" lead SB. Similarly, operating voltage for energizing the hold magnets is supplied from a grounded battery 87 to an outgoing "hold-magnet A" lead HA. "Operating ground B" lead OGB from the hold magnet circuit of Figure 7 is grounded. The outgoing leads of Figure 8 are multipled to the corresponding leads of the hold magnet circuits (Figure 7) of all cross bar switches in the number checker.

Figure 9 represents schematically the cross points of one switch level of any cross bar switch; it is understood that each switch constitutes ten such levels, and, since there are ten switches to a number checker, the number checker comprises one hundred switch levels each identical to that shown schematically in Figure 9. Each cross point is provided with five operating contact terminals; for example at the cross point labeled Vert. 1 (the first vertical column) there are five operating contacts 90, 91, 92, 93, and 94. Corresponding contacts of all cross points of all cross bar switches are cross-wired by means of the "thousands test" leads TT-0 through TT-4 from the thousands code relay circuit of Figure 2. Operation of any cross point closes all five contacts associated with that cross point.

An insulated strapping strip 95 is mounted above the first switch level of each cross bar switch. Strip 95 is provided with a plurality of terminals 96, 97, 98, etc., which terminals are shorted together and extend outwardly to the control circuit of Figure 1 over the "denial of service" lead DS. The contacts (91–94, for example) corresponding to subscribers whose credit standing is satisfactory are left unconnected; however, contacts (90, for example) corresponding to subscribers whose credit standing is unsatisfactory are connected to one of the terminals (97, for example), as by means of a shorting bus 99.

The system of Figures 1–9 is designed to identify a calling subscriber from a preassigned four-period decimal code based on 10,000. The equipment consists of multi-contact relays and normal relays used in conjunction with ten 200-point cross bar switches each with five point multiple. Thus each switch is provided with two hundred pairs of cross points which can be closed on each multiple, thereby providing one thousand terminals per switch. The number checker comprises ten cross bar switches; ten thousand individual terminals are thus available.

For purposes of illustration, and in no sense by way of limitation, a four-period decimal code has been assumed as follows:

| Period 1 | Period 2 | Period 3 | Period 4 | Digit |
|---|---|---|---|---|
| Mark | Space | Space | Space | 1 |
| Space | Mark | Space | Space | 2 |
| Mark | Mark | Space | Space | 3 |
| Space | Space | Mark | Space | 4 |
| Space | Space | Space | Mark | 5 |
| Mark | Space | Space | Mark | 6 |
| Space | Mark | Space | Mark | 7 |
| Mark | Mark | Space | Mark | 8 |
| Space | Space | Mark | Mark | 9 |
| Mark | Space | Mark | Space | 0 |

This code may be transmitted from the subscriber's receiver to the central station 10 (Figure 1) over telephone lines 11 and 12 in any suitable manner. For example, the code may be transmitted from a signal storage device in the receiver as disclosed and claimed in Ellett et al. application Serial No. 83,622. In explaining the operation of the number checker circuit, it will be convenient to assume an exemplary subscriber's code number and to trace the operation of the circuit in response to the receipt at central station 10 of such exemplary code.

Let it be assumed that the code number received by the central station is 7381. This code number is transmitted over telephone lines 11 and 12 to central station 10 in accordance with the four-period decimal code given above; since the identification constitutes four indices or digits, a total of 16 marks and spaces is required. Thus, the assumed code will be transmitted, after an initiating pulse, as space mark space mark—mark mark space space—mark mark space mark—mark space space space. The code number thus represented is converted by suitable equipment at central station 10 to a series of signals on leads TH-1 to TH-5, H-1 to H-5, T-1 to T-5, and U-1 to U5, each series of signals comprising a combination of grounds and opens on a set of four leads. This conversion may be accomplished in any suitable manner; methods for accomplishing the conversion are well known in the art and may comprise a series of flip-flop circuits arranged in cascade. Each series of four leads represents one of the digits or indices of the code number. These leads are designated 1, 2, 4, and 5 so that the sum of the number designations (except for the digit 0) of the grounded leads represents the value of the respective digits. Thus, with the assumed code of 7381, leads TH-2 and TH-5 will be grounded at central station 10 to represent the thousands digit 7. Similarly, leads H-1 and H-2 are grounded to represent the hundreds digit 3, leads T-1, T-2, and T-5 are grounded to represent the tens digit 8; and lead U-1 is grounded to represent the units digit 1.

Upon the receipt of the complete four period decimal code at the central station 10, lead BY is grounded by an operator or by automatic equipment at the central station to initiate the operation of the number checker. This ground causes relay (BY) to operate, extending a ground over lead BG to the thousands code relay circuit of Figure 2.

In the thousands code relay circuit of Figure 2, from the assumed code of 7381, leads TH-2 and TH-5 are grounded. This causes relays (TH-2) and (TH-5) to operate, closing contacts 36, 26, 30, and 28 and opening contacts 34 and 29. Operation of relay (TH-5) extends the OGA lead through contact 30 to the outgoing TH-5 lead. At the same time operation of relay (TH-2) extends lead OGB through contacts 33, 36, and 37 to outgoing lead TT-2. The ground appearing on lead BG from the control circuit of Figure 1 is connected through parallel operated contacts 26 and 28 to the outgoing CG lead and is impressed on lead CG of the hundreds code relay coupling circuit of Figure 3A.

From the assumed code of 7381, leads H-1 and H-2 of the coupling circuit of Figure 3A are grounded from the central station 10 of Figure 1. Lead CG from Figure 2 is grounded by operation of the relays of the thousands code relay circuit of Figure 2. Thus, grounds appear on outgoing leads 1, 2 and CG and are applied to corresponding leads of the hundreds code relay circuit (Figure 4).

In the hundreds code relay circuit of Figure 4, grounds on leads 1 and 2 operate relays (1) and (2), closing contacts 50, 62, 44, 53, 56, 64, 65, 45, and 54 and opening contacts 57, 60, 55, 61, 63, and 52. Operation of these relays extends lead OGA from the control circuit of Figure 1 through contacts 48, 51, 54, and 56 to outgoing lead 3 and thence to the multi-contact relay circuit of Figure 5. The ground appearing on lead CG from the coupling circuit of Figure 3A is transmitted through operated contacts 44 and 45 to outgoing lead DG and to the hundreds code relay coupling circuit of Figure 3A.

In similar manner, leads 1, 2, and 5 of the tens code relay circuit (Figure 4) are grounded from the central station 10 through the coupling circuit of Figure 3B to represent the assumed tens digit, 8. Operation of relays (1), (2), and (5) extends the OGA lead from Figure 1 through contacts 58, 59, 62, and 65 to outgoing lead 8 and thence to the select magnet circuit of Figure 6, and the ground on the DG lead of the hundreds code relay circuit is extended through the coupling circuits of Figures 3A and 3B and contacts 44, 45 and 47 to the DG lead to the coupling circuit of Figure 3B.

Also in like manner, a ground appears on lead 1 in the units code relay circuit (Figure 4) from central station 10 through the coupling circuit of Figure 3C to represent the assumed units digit, 1. Relay (1) of the units code relay circuit operates to extend the OGA lead through contacts 48, 51, 52, and 53 to outgoing lead 1 and to the hold magnet circuits of Figure 7, and the ground appearing on lead DG from the tens code relay circuit is extended through the coupling circuits of Figures 3B and 3C, through contact 44, and through outgoing lead DG to the coupling circuit of Figure 3C and thence to lead CG of the control circuit of Figure 1.

In the control circuit of Figure 1, the ground appearing on lead CG from the units code relay circuit (Figure 4) operates relay (OGA). Operation of relay (OGA) grounds the OGA lead to the thousands code relay circuit of Figure 2 and to the hundreds code relay circuit, the tens code relay circuit, and the units code relay circuit (Figure 4). Operation of relay (OGA) also completes the energizing circuit for the number "checker disconnect" relay (CD), operating this relay and opening the CD lead toward the central station 10.

The ground appearing on outgoing leads OGA in the control circuit of Figure 1 extends through the respective operated contacts of the code relay circuits of Figures 2 and 4, over paths previously described.

The ground appearing on outgoing lead 8 of the tens code relay circuit (Figure 4) is transmitted to the correspondingly numbered incoming leads of the select magnet circuits of all cross bar switches (Figure 6) and conditions all number-8 select magnets for operation; however, these select magnets cannot operate until such time as an operating voltage appears on the "select-magnet battery" lead SB from the battery supply circuit of Figure 8 through the hold magnet circuit of Figure 7. Similarly, the ground appearing on outgoing lead 1 of the units code relay circuit (Figure 4) is transmitted to the correspondingly numbered leads of the hold magnet circuits of all cross bar switches (Figure 7) and conditions hold magnets 1 and 11 of all cross bar switches for operation; however, these hold magnets cannot operate until such time as operating voltage appears on lead HB from battery 87 of the battery supply circuit of Figure 8 through lead HA, the operated contacts of any one of the select magnets of the circuit of Figure 6, and lead HB. Thus, the index signals representing the tens digit and the units digit condition certain select magnets and hold magnets of all cross bar switches for operation, thereby selecting collectively 20 cross points or 100 cross point contact terminals. At the same time, a ground appears on lead TH-5 in the multi-contact relay circuit of Figure 5 from the thousands code relay circuit of Figure 2, and multi-contact relay (MC-5) (Figure 5) is operated. The ground appearing on outgoing lead 3 of the hundreds code relay circuit (Figure 4) is then transmitted through the operated contact of relay (MC-5) associated with lead 3 through outgoing lead HR to the hold magnet circuit of the seventh cross bar switch (Figure 7). In the hold magnet circuit of the seventh cross bar switch, the ground appearing on the HR lead causes relay (BR) to operate, closing contacts 81 and 85. Operating voltage from battery 86 is supplied through lead SB and operated contact 85 of relay (BR) to lead SB of the select magnet circuit of the seventh cross bar switch (Figure 6), thus causing select magnet number-8 of the seventh switch to operate. Operation of relay (BR) also closes contact 81 extending lead HB from the select magnet circuit of the same switch to hold magnets 10 through 19 of that switch, which hold magnets constitute the "right half" of the switch. Upon operation of select magnet number-8 in the select magnet circuit of Figure 6, operating voltage is supplied to hold magnets 10 through 19 of the seventh cross bar switch from battery 87 over lead HA, through the operated contact of select magnet number-8 and through lead HB and closed contact 81 of relay (BR). Thus, it is seen that the hundreds index signal and one of the thousands test signals cooperate to energize only one-half of a certain one of the ten cross bar switches constituting the number checker.

Consequently, only one of the twenty cross points previously conditioned for operation is actually operated.

Operation of the selected cross point extends a ground from the battery supply circuit of Figure 8 through the closed contacts of any operated hold magnet to the OGB lead toward the control circuit of Figure 1. In Figure 1, this ground appearing on lead OGB causes relay (OGB) to operate. Operation of relay (OGB) closes contact 14, locking relay (BY) for as long as any cross point remains operated. Operation of relay (OGB) also interrupts the energizing path for the "checker disconnect" relay (CD) by opening contact 19 and closes contact 16 to extend a ground to the outgoing OGB lead toward the thousands code relay circuit of Figure 2. Interruption of the energizing path for relay (CD) initiates the holding flux decay of that relay, and the ground appearing on outgoing lead OGB extends through the previously described path in the thousands code relay circuit of Figure 2 to outgoing "thousands test" lead TT-2.

As shown in Figure 9, there are associated with each cross point five contact terminals which are cross-wired to the "thousands test" leads TT-0 to TT-4. The operated cross point represents five identification numbers, one for each contact terminal. In the assumed illustration, the operated cross point represents identification numbers 5381, 6381, 7381, 8381, 9381. From operation of the thousands code relay circuit of Figure 2, a ground appears on lead TT-2. As seen in Figure 9, this ground appears on the third set of contacts of all cross points of all cross bar switches. In the absence of any connection from the third contact of the operated cross point to one of the terminals on the insulated strapping strip 95, the ground appearing on lead TT-2 is not extended to the "denial of service" lead DS toward the control circuit of Figure 1. The absence of a ground on lead DS in the control circuit of Figure 1 indicates that the credit standing of the subscriber is satisfactory and that the key signal pattern may be transmitted to that subscriber.

However, in the event that the credit standing of the subscriber corresponding to identification number 7381 is unsatisfactory, a jumper is preconnected between the contact terminal represented by that number and a terminal on the insulating strapping strip 95. In this event, the ground appearing on lead TT-2 is transmitted to the "denial of service" lead DS of the control circuit of Figure 1. This causes the "denial of service" relay (DS) to operate, transmitting a ground to the central station 10 over lead DS and indicating that the subscriber is not to receive the requested key signal pattern. Equipment may be provided at the central station for transferring the call in such an event to a special operator for such handling as may be desirable.

During the time that the thousands test signal on lead TT-2 has selected a single contact terminal at the operated cross point, relay (CD) (Figure 1) has been preparing to release. A time delay of approximately ⅛ of a second in the release of relay (CD) is allowed to provide time for the operation of relay (DS) in the event that the credit standing of the subscriber is unsatisfactory. On release, the contact of relay (CD) is closed, and a ground is transmitted over lead CD to the central station 10 indicating that the number checking operation has been completed. When this ground is received at the central station, the grounds appearing on leads TH-1 to TH-5, H-1 to H-5, T-1 to T-5, and U-1 and U-5 are removed, thus releasing the number checker.

It is to be clearly understood that the system shown and described may be modified to provide other desirable features. For example, a trouble indicator circuit may be incorporated in the system to provide an indication at the central station 10 of the time and location of any faulty operation. Furthermore, provision may be made to insure against the possibility of simultaneous operation of more than one cross point in response to the application of a single identification indication. Also, a plurality of number checkers may be connected to central station 10 through a link circuit capable of selecting any free number checker to operate on a given call. Circuits for accomplishing these results constitute no part of the present invention and will readily occur to those skilled in the art.

In summary an identification code received at a central station is converted to a series of signals for each of the indices constituting such code. For example, each digit of an identification number is converted at the central station to a series of signals; in the illustrated embodiment, these signals appear as a series of grounds on selected ones of an individual group of four leads for each digit. The series of signals representing the units digit, the tens digit, and the hundreds digit are individually converted to a single index signal representing each of those respective digits, and the series of signals representing the thousands digit is converted to a pair of test signals which collectively represent the thousands digit. The tens digit index signal and the units digit index signal cooperate to select a plurality of cross points for operation. The hundreds digit index signal and one of the test signals cooperate to single out one of these cross points. The second test signal operates to select a single contact terminal at the operated cross point. The information desired at the central station is represented by a signal from the finally selected contact terminal at the operated cross point; in the illustrated embodiment, this signal constitutes either the ability or the failure to receive the second test signal over a separate lead at the central station.

Thus, the present invention provides automatic traffic equipment for obtaining information regarding a coded identification indication; in the preferred embodiment described, the information desired is the credit standing of the subscriber represented by the identification indication, and the absence of a ground on a particular lead at the central station indicates that the subscriber's standing is satisfactory while the presence of a ground on that lead indicates that his credit standing is unsatisfactory. For purposes of illustration, a system has been described for operating on a four-index decimal code identification number. It is contemplated that other code systems may be employed; for example, an alphabet code may be used, in which event appropriate modifications of the circuit will be required. Furthermore, the system as described is capable of accommodating a total of ten thousand subscribers. The size of the system may be expanded by combining several systems of the type shown in a manner well known in the art. It is also contemplated that in certain applications, as for example in equipment such as a block relay frame and number group connector, it may be desirable to obtain several pieces of information about any given identification indication. In this event, the several contact terminals associated with each cross point may each be utilized to convey a separate piece of information regarding that indication; in such an event, the traffic capability of the system would be decreased by a factor of five.

It is to be clearly understood that the use of the system disclosed is not restricted to subscription type radio or television systems. The invention may also be employed to advantage, for example, in large commercial business establishments where rapid credit establishment of a prospective customer is desired. In such an adaptation, each customer may be provided with a charge plate having characteristic marking portions for registering the customer's identification code on a sales slip, and the registered code may be converted to a series of electrical signals which operate the number checker in the manner described above. Other applications of the invention will readily occur to those skilled in the art.

While the present invention has been shown and described in connection with a certain present preferred embodiment thereof, it is apparent that numerous variations and modifications may be made, and it is contemplated in the appended claims to cover all such variations and modifications as fall within the true spirit and scope of the invention.

I claim:

1. Apparatus for automatically obtaining at a central station information regarding a multi-component identification code each component of which is represented by a series of electrical signals, said apparatus comprising: a plurality of cross bar switch devices individually having a column of select magnets and a row of hold magnets and individually having contact terminals at the cross point defined by each select magnet and each hold magnet, each of said terminals being assigned to represent an individual identification code; a signalling circuit extending from said switch devices to said central station; means extending from one of said terminals to said signalling circuit to establish a signalling condition in said signalling circuit representing information to be disseminated with respect to the identification code assigned to said one terminal; means respectively multipling in groups corresponding select magnets in all columns and corresponding hold magnets in all rows; apparatus for converting each of said series of signals to a single index signal representing one component of said identification code; means for supplying a first one of said index signals to a selected one of said groups of multipled hold magnets and for supplying a second one of said index signals to a selected one of said groups of multipled select magnets to condition a plurality of cross points for operation; and means responsive to the application of a third one of said index signals for operating the contact terminals associated with a single one of said conditioned cross points.

2. Apparatus for automatically obtaining at a central station information regarding a multicomponent identification code each component of which is represented by a single index signal, said apparatus comprising: a plurality of cross bar switch devices individually having a column of select magnets and a row of hold magnets and individually having contact terminals at the cross point defined by each select magnet and each hold magnet, each of said terminals being assigned to represent an individual identification code; a signalling circuit extending from said switch devices to said central station; means extending from one of said terminals to said signalling circuit to establish a signalling condition in said signalling circuit representing information to be disseminated with respect to the identification code assigned to said one terminal; means respectively multipling in groups corresponding select magnets in all columns and corresponding hold magnets in all rows; means for supplying a first one of said index signals to a selected one of said groups of multipled hold magnets and for supplying a second one of said index signals to a selected one of said groups of multipled select magnets to condition a plurality of cross points for operation; and means responsive to the application of a third one of said index signals for operating the contact terminals associated with a single one of said conditioned cross points.

3. Apparatus for automatically obtaining at a central station information regarding a multicomponent identification code each component of which is represented by a single index signal, said apparatus comprising: a plurality of cross bar switch devices individually having a column of select magnets and a row of hold magnets and individually having a plurality of contact terminals at the cross point defined by each select magnet and each hold magnet, each of said terminals being assigned to represent an individual identification code; a signalling circuit extending from said switch devices to said central station; means extending from one of said terminals to said signalling circuit to establish a signalling condition in said signalling circuit representing information to be disseminated with respect to the identification code assigned to said one terminal; means respectively multipling corresponding contact terminals of all of said cross points; means respectively multipling in groups corresponding select magnets in all columns and corresponding hold magnets in all rows; means for supplying a first one of said index signals to a selected one of said groups of multipled hold magnets and for supplying a second one of said index signals to a selected one of said groups of multipled select magnets to condition a plurality of cross points for operation; and means responsive to the application of a third one of said index signals for operating the contact terminals associated with a single one of said conditioned cross points.

4. Apparatus for automatically obtaining at a central station information regarding a multicomponent identification code each component of which is represented by a series of electrical signals, said apparatus comprising: a plurality of cross bar switch devices individually having a column of select magnets and a row of hold magnets and individually having contact terminals at the cross point defined by each select magnet and each hold magnet, each of said terminals being assigned to represent an individual identification code; a signalling circuit extending from said switch devices to said central station; means extending from one of said terminals to said signalling circuit to establish a signalling condition in said signalling circuit representing information to be disseminated with respect to the identification code assigned to said one terminal; means respectively multipling in groups corresponding select magnets in all columns and corresponding hold magnets in all rows; apparatus at said central station for sequentially converting each of said series of signals to a single index signal representing one component of said identification code; means for supplying a first one of said index signals to a selected one of said groups of multipled hold magnets and for supplying a second one of said index signals to a selected one of said groups of multipled select magnets to condition a plurality of cross points for operation; and means responsive to the application of a third one of said index signals for operating the contact terminals associated with a single one of said conditioned cross points.

5. Apparatus for automatically obtaining at a central station a single piece of information regarding a four-component identification code each component of which is represented by a series of electrical signals, said apparatus comprising: a plurality of cross bar switch devices individually having a column of select magnets and a row of hold magnets and individually having a plurality of contact terminals at the cross point defined by each select magnet and each hold magnet, each of said terminals being assigned to represent an individual identification code; a signalling circuit extending from said switch devices to said central station; means extending from one of said terminals to said signalling circuit to establish a signalling condition in said signalling circuit representing information to be disseminated with respect to the identification code assigned to said one terminal; means respectively multipling in groups corresponding select magnets in all columns and corresponding hold magnets in all rows; apparatus for converting one of said series of signals to a pair of test signals collectively representing one component of said identification code; apparatus for converting each of the others of said series of signals to a single index signal representing one of the other components of said identification code; means for supplying a first one of said index signals to a selected one of said groups of multipled hold magnets and for supplying a second one of said index signals to a selected one of said groups of multipled select magnets to condition a plurality of cross points for operation; means conjointly responsive to one of said test signals and to a third one of said index signals for operating the contact terminals associated with a single one of said conditioned cross points; and means responsive to the other of said test signals for selecting a single contact terminal at said operated cross point.

6. Apparatus for automatically obtaining at a central station a single piece of information regarding a four-component identification code three of the components of which are individually represented by a single index signal and the fourth component of which is collectively represented by a pair of test signals, said apparatus comprising: a plurality of cross bar switch devices individually having a column of select magnets and a row of hold magnets and individually having a plurality of contact terminals at the cross point defined by each select magnet and each hold magnet, each of said terminals being assigned to represent an individual identification code; a signalling circuit extending from said switch devices to said central station; means extending from one of said terminals to said signalling circuit to establish a signalling condition in said signalling circuit representing information to be disseminated with respect to the identification code assigned to said one terminal; means respectively multipling in groups corresponding select magnets in all columns and corresponding hold magnets in all rows; means for supplying a first one of said index signals to a selected one of said groups of multipled hold magnets and for supplying a second one of said index signals to a selected one of said groups of multipled select magnets to condition a plurality of cross points for operation; means conjointly responsive to one of said test signals and to a third one of said index signals for operating the contact terminals associated with a single one of said conditioned cross points; and means responsive to the other of said test signals for selecting a single contact terminal at said operated cross point.

7. Apparatus for automatically obtaining at a central station a single piece of information regarding a four-component identification code three of the components of which are individually represented by a single index signal and the fourth component of which is collectively represented by a pair of test signals, said apparatus comprising: a plurality of cross bar switch devices individually having a column of select magnets and a row of hold magnets and individually having a plurality of contact terminals at the cross point defined by each select magnet and each hold magnet, each of said terminals being assigned to represent an individual identification code; a signalling circuit extending from said switch devices to said central station; means extending from one of said terminals to said signalling circuit to establish a signalling condition in said signalling circuit representing information to be disseminated with respect to the identification code assigned to said one terminal; means respectively multipling corresponding contact terminals at all cross points; means respectively multipling in groups corresponding select magnets in all columns and corresponding hold magnets in all rows; means for supplying a first one of said index signals to a selected one of said groups of multipled hold magnets and for supplying a second one of said index signals to a selected one of said groups of multipled select magnets to condition a plurality of cross points for operation; means conjointly responsive to one of said test signals and to a third one of said index signals for operating the contact terminals associated with a single one of said conditioned cross points; and means responsive to the other of said test signals for selecting a single contact terminal at said operated cross point.

8. Apparatus for automatically obtaining at a central station a single piece of information regarding a four-component identification code each component of which is represented by a series of electrical signals, said apparatus comprising: a plurality of cross bar switch devices individually having a column of select magnets and a row of hold magnets and individually having a plurality of contact terminals at the cross point defined by each select magnet and each hold magnet, each of said terminals being assigned to represent an individual identification code; a signalling circuit extending from said switch devices to said central station; means extending from one of said terminals to said signalling circuit to establish a signalling condition in said signalling circuit representing information to be disseminated with respect to the identification code assigned to said one terminal; means respectively multipling in groups corresponding select magnets in all columns and corresponding hold magnets in all rows; apparatus at said central station for converting one of said series of signals to a pair of test signals collectively representing one component of said identification code; apparatus at said central station for sequentially converting each of the others of said series of signals to a single index signal representing one of the other components of said identification code; means for supplying a first one of said index signals to a selected one of said groups of multipled hold magnets and for supplying a second one of said index signals to a selected one of said groups of multipled select magnets to condition a plurality of cross points for operation; means conjointly responsive to one of said test signals and to a third one of said index signals for operating the contact terminals associated with a single one of said conditioned cross points; and means responsive to the other of said test signals for selecting a single contact terminal at said operated cross point.

9. Apparatus for automatically obtaining at a central station a single piece of information regarding a multi-component identification code one of the components of which is collectively represented by a pair of test signals, said apparatus comprising: a cross bar switch device having a column of select magnets and a row of hold magnets and having a plurality of contact terminals at the cross point defined by each select magnet and each hold magnet, each of said terminals being assigned to represent an individual identification code; a signalling circuit extending from said switch devices to said central station; means extending from one of said terminals to said signalling circuit to establish a signalling condition in said signalling circuit representing information to be disseminated with respect to the identification code assigned to said one terminal; means respectively multipling in groups corresponding contact terminals at all cross points; means responsive to one of said test signals for selecting one of said groups of terminals; and means responsive to the other of said test signals and to the remaining components of said identification code for operating all contact terminals at a single cross point.

MALCOLM M. HUBBARD.

REFERENCES CITED

The following references are of record in the file of this patent:

UNITED STATES PATENTS

| Number | Name | Date |
|---|---|---|
| 2,096,819 | Myers | Oct. 26, 1937 |
| 2,139,079 | Haselton | Dec. 6, 1938 |
| 2,199,824 | Kinkead | May 7, 1940 |
| 2,446,643 | Farmer | Aug. 10, 1948 |